Sept. 9, 1969  F. H. TENNIS  3,465,788
HYDRAULIC CONTROL VALVE WITH VOID PREVENTION MEANS
Filed Sept. 1, 1967  3 Sheets-Sheet 3
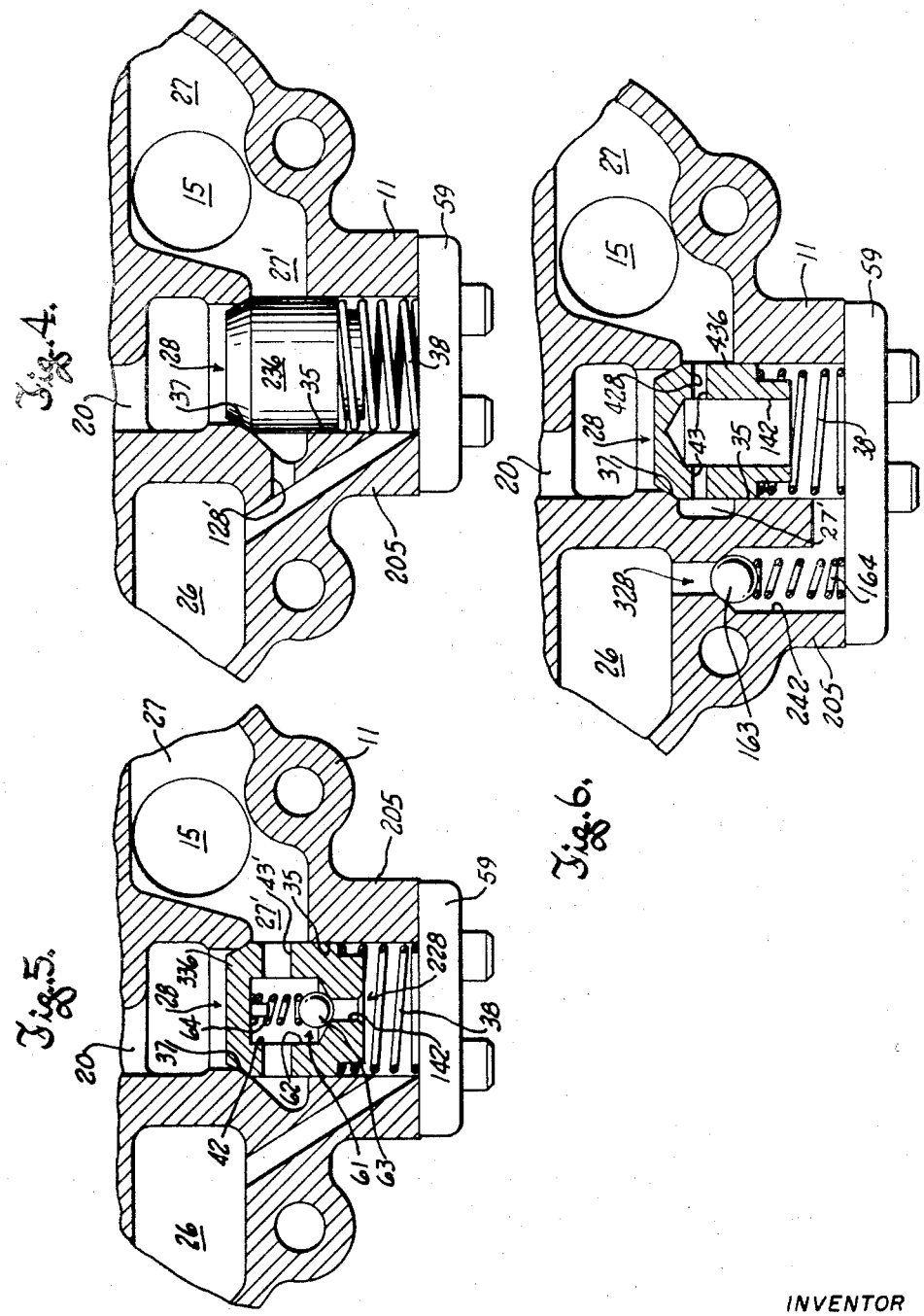
INVENTOR
Francis H. Tennis
ATTORNEY United States Patent Office 3,465,788
Patented Sept. 9, 1969

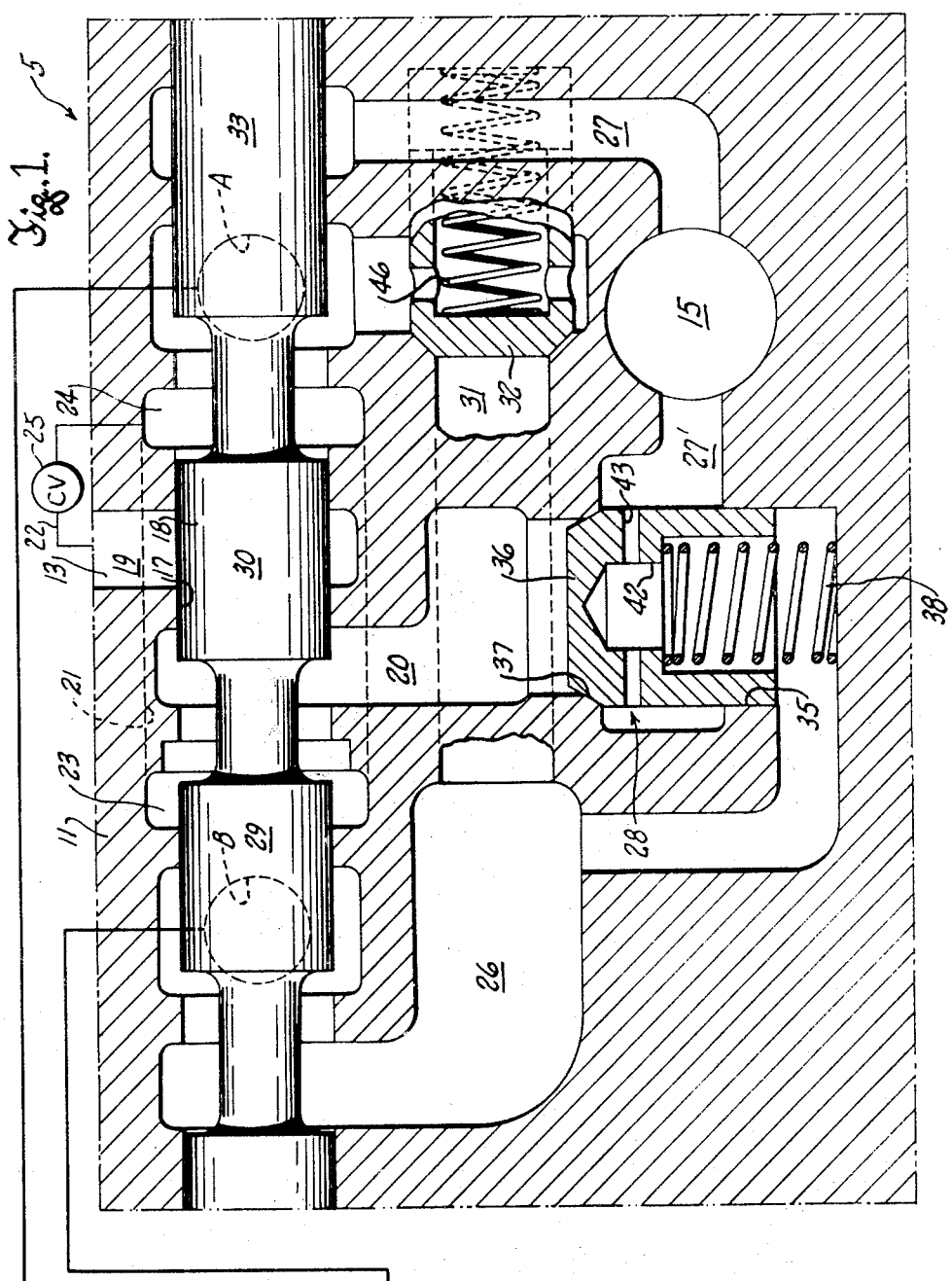

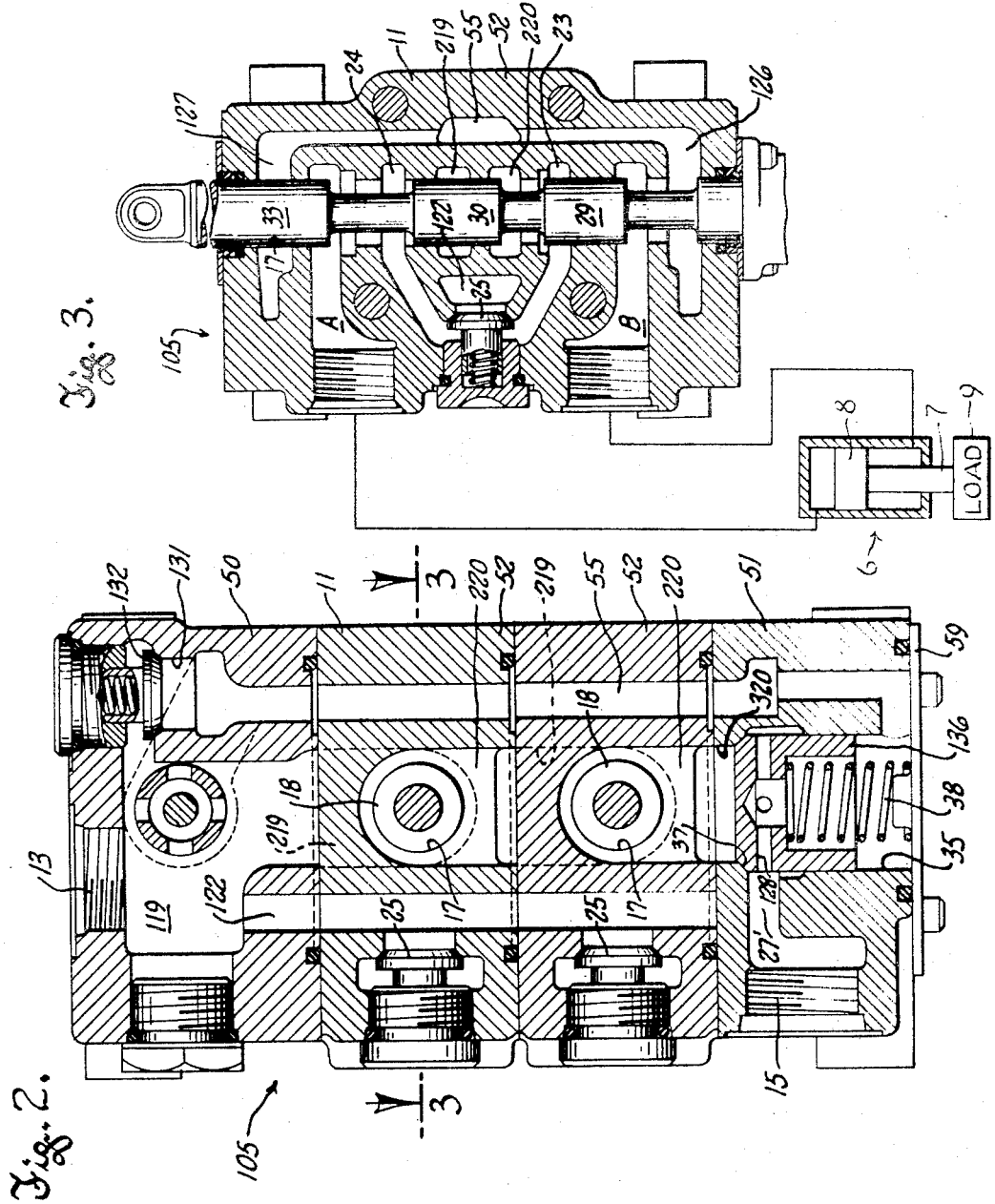

3,465,788
HYDRAULIC CONTROL VALVE WITH VOID PREVENTION MEANS
Francis H. Tennis, Oconomowoc, Wis., assignor, by mesne assignments, to Koehring Company, Milwaukee, Wis., a corporation of Wisconsin
Filed Sept. 1, 1967, Ser. No. 665,054
Int. Cl. F15b *11/16;* F16k *11/07*
U.S. Cl. 137—596                        10 Claims

ABSTRACT OF THE DISCLOSURE

In the "float" position of a control valve for a double acting cylinder, return fluid from the cylinder is load pressurized upstream from a restriction through which it must flow to a vent, and such load pressurized fluid is fed to the expanding end of the cylinder through a feedback passage containing an anti-void check valve. Pressure responsive valve means that controls flow of pump fluid to the vent has one side exposed to such return fluid, its other side to pump fluid. High return fluid pressure, due to rapid piston descent, causes the valve means to close and divert pump fluid to the expanding end of the cylinder.

---

This invention pertains to control valves for hydraulic motors, and relates more particularly to a control valve of the type having a so-called "float" position in which a reversible hydraulic motor controlled by the valve can be more or less freely driven by gravity or by an inertia load.

A control valve of the type to which this invention relates has an inlet for pressure fluid, an outlet, and a pair of service passages connectable with opposite sides of the hydraulic motor to be controlled. It also has a valve element which is movable to different defined positions to provide for connection of the several passages in various selected combinations. In the "float" position of the valve element, the passages are so connected that return fluid from either side of the motor is permitted to flow through the control valve to be available to the other side of the motor, so that the flow of fluid to and from the motor is determined almost entirely by motor load conditions.

In the case of a control valve intended for a motor comprising a double-acting hydraulic cylinder having a rod extending in one direction from its piston, the arrangement of passage connections for "float" must take account of the fact that the flows of fluid to and from the cylinder will not be equal, owing to the volume displaced by the rod. Hence, with a control valve for such cylinders, and for other fluid motors with similar characteristics, it is not possible to achieve a "float" condition by means of a mere interconnection of the service passages with one another. Instead, the heretofore conventional arrangement of passage connections in the "float" position of the control valve has provided for communication of the service passages not only with one another but also with both the inlet and the outlet. With this arrangement the only fluid available to the expanding end of the cylinder was substantially unpressurized, and therefore cavitation could occur in certain cases.

The problem of cavitation is not peculiar to valves having a "float" position. It also exists, but has been solved, in the case of control valves having only "hold," "raise" and "lower" positions.

As a specific example, Patent No. 2,980,135, issued to F. H. Tennis on Apr. 18, 1961, discloses a void control means in a control valve for a double-acting hydraulic cylinder that raises and lowers the heavy boom of a digging machine such as a power shovel, end loader or back hoe. In the "down" position of its control valve element the pressure fluid inlet of that control valve was communicated with the expanding (upper) end of the cylinder, while the contracting (bottom) end of the cylinder was connected with the control valve outlet. In the absence of the void control means disclosed in that patent, the boom could have moved downwardly so rapidly under its own weight, when the control valve was in the "down" position, that flow of fluid from the pump would have been inadequate to fill the rapidly expanding upper end of the cylinder.

Of course, when the cylinder is so arranged that fluid is rapidly expelled from its rod end during such descent of the boom, there is no possibility of filling the expanding large volume end of the cylinder with fluid obtained only from its contracting rod end. Hence after the bucket hit the ground there would have been an appreciable delay before digging into the ground could have been commenced, even though the control valve continued to be held in the "down" position. This delay interval would have persisted while substantially unpressurized fluid flowed into the upper end of the cylinder to fill the void therein, and until the cylinder was filled and pressure came up to its normal value in the cylinder and all through the control valve and the ducts connecting the control valve with the pump and the cylinder.

The anti-cavitation means disclosed in Patent No. 2,980,135 prevented cavitation and temporary power loss in the "down" position of the valve by causing load pressurized exhaust fluid from the contracting end of the cylinder to be fed back to the expanding end of the cylinder together with fluid from the pump whenever cavitation might otherwise have occurred. Consequently, it was especially useful in installations where the cylinder was arranged to have its piston rod be extended in the power down position of the valve.

This cavitation control means comprises a restriction in the exhaust passage that led to the control valve outlet from the service passage connected with the bottom end of the cylinder, whereby fluid in that exhaust passage was maintained under a load produced pressure that depended upon the rate of return fluid flow; and hence the pressure of such fluid was highest at those times when the piston of the cylinder was moving fastest and cavitation was most likely to occur. The exhaust passage in which such load pressurized fluid flowed was communicable with the service passage connected with the upper end of the cylinder by way of a feed back passage controlled by a check valve that normally prevented flow of fluid from the pump into the exhaust passage. But whenever pressure in the exhaust passage exceeded that in the service passage connected with the upper end of the cylinder, the load pressurized fluid from the exhaust passage could flow through the check valve to the upper end of the cylinder, augmenting the flow of fluid from the pump, not only to prevent the formation of a void but also to prevent any substantial loss of pressure in the system and thereby assure the operator of control over the cylinder at all times.

Thus in the arrangement of Patent No. 2,980,135 two sources of pressurized fluid were available to the expanding end of the cylinder for prevention of a void, namely pressure fluid from the pump, which comprised the normal source, and load pressurized return fluid which served as a supplementary source.

The control valve of that patent did not, however, have a "float" position, in whch the cylinder was free to move in either direction in response to forces upon it. The provision of such a "float" position has become common in control valves for various types of installations and is a popular expedient for achieving fast lowering of the implement boom in back hoes, power shovels and the like.

But the problem of cavitation in the "float" position has heretofore remained unsolved. In heretofore conventional control valves provided with a "float" position, there was no source of pressurized fluid available for void control owing to the fact that when the valve element was in its "float" position the service passages and the pressure fluid inlet were all communicated with the control valve outlet.

The problem of cavitation in the "float" position was particularly severe in installations where the double-acting lift cylinder controlled by the valve was installed with its rod end lowermost, for in such cases the volume of the upper end of the cylinder increased at a rate much faster than the volume of its bottom end decreased.

With the foregoing considerations in mind, it is the general object of the present invention to provide a control valve for a double-acting hydraulic cylinder or the like, which control valve has a "float" position and incorporates means whereby pump fluid from the control valve inlet is diverted to the service passage connected with the expanding end of the cylinder, and whereby load pressurized return fluid from the contracting end of the cylinder is made available to the expanding end of the cylinder to the extent that such return fluid is needed to augment the flow of pump fluid for preventing void formation.

Another and more specific object of this invention is to provide, in a control valve of the character described, valve means operative in the "float" position of the control valve to block flow of pump fluid to the control valve outlet and thus divert pump pressure fluid from the control valve inlet to the service passage connected with the expanding end of the cylinder, but which valve means effects such diversion of pump fluid to the cylinder only to the extent that such flow of pump fluid is needed to prevent cavitation.

Hence it is another object of this invention to provide a control valve for a reversible hydraulic motor, which control valve has means operative in a "float" position for diverting pump pressure fluid from an inlet of the control valve to a service passage thereof for flow to the expanding side of the motor, and whereby the rate at which such diversion of pump fluid takes place is controlled by the rate at which load pressurized fluid returns from the motor, so that pump fluid is fed to the expanding side of the motor only to the extent that it is required for void prevention, and not to an extent that interferes with "float" actuation of the cylinder by its load.

Another object of this invention is to provide a hydraulic control valve of the character described having void control means which is operative in the "float" position of the valve and which does not interfere with normal functioning of the apparatus in any position of the control valve.

Another specific object of this invention is to provide a hydraulic control valve having void control means operative in a "float" position as set forth in the preceding statements of object, and also having a "power down" position in which void control is provided for.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate several complete examples of the physical embodiment of the invention constructed according to the best mode so far devised for the practical application of the principles thereof, and in which:

FIGURE 1 is a more or less diagrammatic sectional view of a control valve embodying the principles of this invention with the spool thereof shown in its "float" position;

FIGURE 2 is a more or less diagrammatic sectional view of a multiple spool control valve incorporating the void prevention means of this invention;

FIGURE 3 is a sectional view taken on the plane of the line 3—3 in FIGURE 2;

FIGURES 4, 5 and 6 are fragmentary sectional views of other embodiments of the invention.

Referring now to the accompanying drawings, and particularly to FIGURE 1, the numeral 5 designates generally a control valve for a hydraulic motor 6 comprising a double-acting hydraulic cylinder of the type having a rod 7 projecting through one end thereof for connecting its piston 8 with a load 9. As shown, the rod end of the cylinder is uppermost, but the invention is equally applicable to any other reversible hydraulic motor and is especially advantageous where the motor is a cylinder that has its rod end lowermost.

The control valve 5 comprises a body 11 having a first service passage A that is connectable with the upper end of the cylinder and a second service passage B that is connectable with the bottom end of the cylinder. The valve body 11 also has an inlet 13 for pressure fluid, connectable with a pump (not shown) or similar pressure fluid source, and an outlet 15 connectable with a substantially unpressurized fluid reservoir or tank (not shown).

The two service passages A and B open to axially spaced apart portions of a bore 17 in the valve body in which a spool or movable valve element 18 is slidable. Also opening to the bore 17 at locations axially intermediate its junctions with the service passages are an inlet passage 19 that communicates with the inlet 13 and an outlet passage 20 that is communicable with the outlet 15. A feeder passage 22 connecting with the inlet passage 19 at a point therein upstream from its junction with the bore 17 communicates with a bridge passage comprising branch passages 23 and 24, bridged as at 21 and as seen in FIGURE 3. The branches 23 and 24 open to the bore 17 at opposite sides of its junctions with the inlet passage 19 and the outlet passage 20. A check valve 25 (see FIGURE 3) prevents flow of fluid from either bridge branch back through the feeder passage to the inlet.

Exhaust or return fluid passages 26 and 27 also intersect the bore 17 at zones thereof that are axially outward of its junctions with service passages B and A, respectively. Exhaust passage 27 communicates the bore directly with the outlet 15 and terminates in a well 27' into which the outlet passage 20 opens downwardly. Exhaust passage 26 is communicated with the outlet 15 through restriction means 28 described hereinafter.

The spool 18 of course provides for selection of any one of several different arrangements of communication between the passages that open to the bore 17.

In a "neutral" position of the spool, to the right of that illustrated, service passages A and B are prevented from communicating with one another and with the other passages, to prevent flow of fluid into and out of the cylinder and thereby prevent motion of the piston 8, while the inlet passage 19 is communicated with the outlet passage 20 through the bore 17. The control valve 5 will thus be recognized as being of the so-called open center type, in which the inlet passage 19 and the outlet passage 20 respectively comprise the upstream and downstream branches of a through passage. It will also be recognized that the connecting passages 21, 22, 23 and 24 comprise branches of a pressure fluid supply passage which is vented to the outlet via the open center passage when the valve spool is in a neutral position communicating the upstream and downstream branches 19 and 20, respectively, of the open center passage.

When the spool 18 is placed in a "raise" position, to the right of its "neutral" position, a land 29 on the spool blocks communication between the inlet passage 19 and the outlet passage 20 to pressurize the supply passage of which the bridge passage is a part; communication between service passage A and branch 24 of the bridge passage is blocked by another land 30 on the spool; and service passage B is communicated through the bore with its adjacent branch 23 of the bridge passage to cause pump pressure fluid from the inlet 13 to flow to the bottom end of the cylinder. At the same time, service passage A is communicated with its adjacent exhaust passage 27, to vent return fluid from the upper end of the cylinder to the outlet 15.

When the spool 18 is placed in a "power down" position, intermediate its "neutral" position and the position shown, communication between inlet passage 19 and outlet passage 20 is blocked by spool land 30 to again pressurize the bridge passage; branch 23 of the bridge passage is blocked by the land 29; and service passage A is communicated with its adjacent branch 24 of the bridge passage to cause supply pressure fluid to flow to the upper end of the cylinder. Meanwhile, service passage B is communicated with its adjacent exhaust passage 26.

In the "power down" position of the spool, cavitation would be possible. To prevent cavitation, especially if the cylinder 6 were arranged to have its piston rod pull rather than push the load 9 upwardly, as in FIGURE 3, the control valve 5 is provided with void control means comprising the restriction means 28 through which exhaust passage 26 is communicated with the outlet 15, and a feedback passage 31, controlled by a check valve 32, through which return fluid can flow from exhaust passage 26 to service passage A.

As long as the feedback check valve 32 remains closed, the pressure of return fluid in exhaust passage 26 will depend upon the rate of return fluid flow from service passage B, owing to the presence of restriction means 28 in the communication between exhaust passage 26 and the outlet 15. This is to say that fluid pressure in exhaust passage 26 varies with the rate of descent of the piston 8.

It will be apparent that the rate of piston descent also tends to control the pressure of fluid in service passage A. In the absence of void control means, a rapid descent of the piston would cause a severe pressure drop in service pasage A so that pump fluid would not be fed into the upper end of the cylinder quickly enough to fill it, and cavitation would occur. However, this cannot happen with the valve illustrated in FIGURE 1, because such a pressure drop in service passage A is concomitant with an increase in pressure in exhaust passage 26; and whenever the pressure in exhaust passage 26 exceeds that in service passage A, load pressurized fluid flows from exhaust passage 26 to service passage A by way of the feedback passage 31. Such load pressurized return fluid augments the flow of pump fluid to the starving end of the cylinder, thus preventing voids and maintaining pressure in the system.

The feedback check valve 32 of course remains closed whenever pressure in service passage A exceeds that in exhaust passage 26. Hence, whenever the control valve is in its "power down" position and the rate of piston descent is slow enough so that pump fluid remains under substantial pressure, the pump provides the sole source of fluid flowing into the expanding upper end of the cylinder, and all return fluid is vented through the outlet 15.

The spool 18 of the control valve of this invention also has a "float" position, in which it is illustrated in FIGURE 1. The interconnection of passages that the spool provides for when in its "float" position is that which is conventional for "float" insofar as the inlet 13 and hence the supply passage are communicated with the service passage A, while the supply passage and the two service passages A and B are all vented to the outlet 15. In the present case, however, the land 30 on the spool prevents the supply passage from being communicated directly via the open center branches 19 and 20 with outlet 15. Instead, pump fluid flows from the inlet 13 to the outlet by way of the supply passage and specifically, the bridged branches 23 and 24 thereof. This results from the fact that when the valve spool is in its float position shown, bridge branch 24 is in communication with service passage A while bridge branch 23 is communicated with the downstream branch 20 of the open center passage through a part of the bore 17. In this case, too, a land 33 on the spool blocks communication through the bore between service passage A and its adjacent exhaust passage 27. However, service passage B is communicated through the bore with exhaust passage 26; and therefore, because of the restriction means 28, return fluid in exhaust passage 26 is under load imposed pressure that can, under certain circumstances described hereinafter, force such return fluid through the feedback passage 31 and thence to service passage A for flow to the upper end of the cylinder. Note that in the "float" position of the spool, return fluid from the bottom of the cylinder can follow the same flow path into the upper end of the cylinder that it takes when the spool is in its "power down" position.

When the piston 8 is descending very rapidly with the spool in its "float" position, cavitation is prevented by utilizing pump fluid from the control valve inlet together with the flow of load pressurized return fluid to prevent a void from forming in the expanding end of the cylinder. This is achieved by blocking communication between outlet branch 20 of the through passage and the outlet 15, and thereby diverting fluid under pump pressure to service passage A by way of branch 24 of the bridge passage. For an understanding of the mechanism by which this is achieved, certain other details of the control valve structure must now be explained.

The exhaust well 27' opens downwardly to a bore that defines a pressure chamber 35 in the valve body, in which a pressure responsive valve member 36 is axially slidable, and said well opens upwardly to the passage 20 through a circumferential seat 37 that faces away from the bore 17 and is engageable by the valve member 36 in the closed position of the latter. When valve member 36 is engaged with its seat 37, it prevents communication between the outlet 15 and that portion of the open center passage which is downstream from the bore 17.

Exhaust passage 26 is at all times communicated with the pressure chamber 35, and the pressure chamber has restricted communication with the outlet 15 through the pressure responsive valve member 36. To provide for such restricted communication, the valve member 36 is hollow, having a well 42 therein that opens to the pressure chamber 35 behind it and having small radial bores 43 which open from said well to the exhaust well 27. The restriction comprising the radial bores or orifices 43 causes pressure in the pressure chamber 35 to reflect the rate of return fluid flow due to piston descent.

The valve member 36 is urged towards its seat 37 by an expansion spring 38 the force of which is readily overcome by supply pressure fluid in the through or open center passage 19–20 in the neutral position of the valve spool 18, so as to allow the pump to be unloaded to the outlet 15. When the piston 8 is descending slowly or not at all, in the float position of the valve spool shown, pump fluid in the branch 20 of the open center passage also acts upon the valve member 36 to hold it open so that pump fluid can flow substantially unrestricted to the outlet 15. When the piston descends rapidly, the restriction means 28 causes exhaust passage 26 and pressure in the pressure chamber 35 to attain a value sufficient to move the valve member 36 towards the seat so that it restricts or blocks flow of pump pressure fluid to the outlet 15 and thus causes pump pressurized fluid to be forced into the expanding upper end of the cylinder by way of branch 24 of the bridge passage and service passage A. It will be apparent that the rate at which pump fluid is thus fed to the expanding end of the cylinder depends upon the rate of return fluid flow.

It will also be apparent that in floats, if the pump is able to maintain pressure in the service passage A at times when valve member 36 is closed, the pressure in that service passage coacts with the biasing spring 46 for check valve 32 to hold it closed. However, if pressure in the service passage A continues to drop despite flow of pump fluid to the expanding end of the cylinder, as can happen when the expanding end is the head end of the cylinder, as shown in FIGURE 3, elevated pressure of return fluid in passage 26 opens the check valve 32 so as to cause load pressurized fluid in the return passage to flow to service passage A and to the expanding end of the cylinder together with pump fluid, to prevent formation of a void in the cylinder.

As soon as pressure in the return passage 26 drops to a normal value, the valve member 36 opens automatically under pressure of pump fluid in the outlet branch passage 20, and the pump is immediately unloaded. Check valve 32, of course, will also be closed at that time.

Because the valve member 36 is lightly biased towards its seat by means of the expansion spring 38, fluid in the outlet branch passage 20 tends to be maintained under a slight pressure at all times that the control valve spool is in its "float" position as well as in neutral, but such pressure should be low enough so that in float, no substantial force is exerted upon the piston 8 because of it, and so that a negligible load is likewise imposed upon the pump.

In the embodiment of the invention illustrated in FIGURES 2 and 3, the valve body 105 is of sectional construction, built up of an inlet manifold section 50, in which there is an inlet 13, an exhaust manifold section 51 in which there is an outlet 15, and a plurality of individual spool sections 52 which are assembled in stacked relationship with one another and with the inlet and exhaust manifold sections. In each of the spool sections there is a bore 17 in which a spool 18 is slidable.

The general arrangement is similar to that of the control valve shown and described in F. H. Tennis Patent No. 3,194,265, except that in the present case the valve has a "float" position in addition to the "neutral," "raise" and "lower" positions of the valve of that patent. As may be seen from FIGURE 3, the arrangement of passages in each spool section 52 is generally similar to that of the FIGURE 1 valve, but the several spool sections cooperate to provide for operation in parallel of plurality of hydraulic motors, one controlled by each of the spools.

The inlet 13 in the sectional valve body 105 is connectable with a pump (not shown) or the like and opens to an inlet chamber 119 in the inlet manifold section 50. A feeder chamber 122 intersects the inlet passage 119 and extends continuously downwardly through the several spool sections, for bringing pressure fluid to any spool section that has its spool in an operating position. From the feeder passage portion in each spool section, a pair of bridge passage branches 23 and 24 communicate with the bore 17 in that section in substantially the same arrangement as in the valve of FIGURE 1, with a check valve 25 at the junction of the feeder passage and the bridge passage branches to prevent back flow of fluid from the bridge branches.

The inlet chamber 119 is also intersected by a through passage which extends downwardly through the several spool sections and which comprises an upstream branch 219 in each spool section and a downstream branch 220, each of the latter being in register with the upstream branch of the spool section therebeneath. The downstream branch 220 of the lowermost spool section opens downwardly into a short outlet passage 320 in the exhaust manifold section 51, and the outlet passage 320 in turn opens through a downwardly facing seat 37 into an exhaust well 27', which in turn opens downwardly to a bore defining a pressure chamber 35 in which a pressure responsive valve member 136 is movable toward and from engagement with the valve seat. The exhaust well 27' opens laterally from the pressure chamber 35 to the outlet 15 and cooperates with the outlet passage 320 to provide the portion of the open center passage that is controlled by the valve member 136.

In this case the two exhaust passages 126 and 127 that intersect the bore 17 in each spool section communicate with a common return fluid passage 55 that extends through the several sections of the valve body. At its lower end the return fluid passage 55 is communicated with the pressure hcamber 35 and thence communicates with the exhaust well 27' through restricted orifice means 128 in the pressure responsive valve member 136. At its upper end the return fluid passage 55 is communicable with the inlet chamber 119 through a short feedback passage 131 controlled by a check valve 132.

As explained in the aforesaid Patent No. 3,194,265, when any one of the spools 18 is placed in a "power down" or "lower" position, it blocks the through passage and thereby pressurizes the feeder passage 122 and its associated bridge branches. Pump fluid is thus fed to service passage A, connected with the upper end of the cylinder which the spool controls. At the same time, return fluid from the contracting side of the cylinder is directed into the return fluid passage 55 and is maintained under load imposed pressure due to the restriction provided by the restricted orifice means 128 in the pressure responsive valve member 136. Hence when a spool is in its "power down" position and the piston of its cylinder descends very rapidly, pressure in the return fluid passage 55 exceeds that in the inlet chamber 119, and load pressurized return fluid flows from the return fluid passage 55 through the feedback passage 131 and check valve 132 into the inlet chamber 119, to augment the flow of pressure fluid from the pump in preventing formation of a void and maintaining pressure in the system.

When any one of the spools 18 is placed in its "float" position, the passages communicating with the bore for that spool are interconnected as in the FIGURE 1 embodiment of the invention, that is the service passage B for the bottom end of the cylinder is connected with its adjacent exhaust passage portion 126 so that return fluid can flow to the return header 55; the other service passage A is communicated with its adjacent bridge passage branch 24; and direct communication between the inlet and outlet branches 219 and 220 of the through passage is blocked but the outlet branch 220 of the through passage is communicated through the bore 17 with the other bridge passage branch 23 and hence with the service passage A.

In this case, again, return fluid is under load induced pressure, owing to the restricted communication between the return fluid passage 55 and the exhaust well 27', and such return fluid therefore can, if necessary, flow back to the inlet chamber 119 through the feedback passage 131 and the check valve 132 controlling the same, and thence, through the feeder passage 122 and bridge branch 24, to the service passage A connected with the upper end of the cylinder in this case its large volume end. Load pressurized return fluid in the pressure chamber 35 in this case, too, imposes a force upon the valve member 136 that tends to close the same, while pump pressurized fluid in the outlet passage 320 imposes a force upon it in the direction that tends to open it.

When rapid descent of the piston produces such pressure in the return fluid that the valve member 136 blocks or restricts the flow of pump fluid from passage 320 to the exhaust well 27', pump pressure fluid is compelled to flow to service passage A by way of bridge branch 24, together with return fluid flowing thereto through the check valve controlled feedback passage, if needed, to prevent cavitation.

In the embodiment of the invention illustrated in FIGURE 4, the arrangement of the control valve is generally the same as that of FIGURE 1, but load pressurized return fluid from exhaust passage 26 flows to the exhaust well 27' and then to the outlet 15 through restriction means 128' that comprises a small drilled passage in the valve body 205, rather than through the valve member 236, and the latter has no passage through it.

In the case of the FIGURE 4 embodiment of the invention, as also in the embodiments illustrated in FIGURES 5 and 6, the pressure chamber 35 is defined by a short bore in the valve body 205 that opens to one side thereof, and which transversely intersects the exhaust well 27'. The mouth of said bore is closed by a cover 59 or the like that overlies said side of the body.

In the embodiment of the invention illustrated in FIGURE 5 the general arrangement of the control valve is again like that of FIGURE 1, but the restriction means 228 between the pressure chamber 35 and the exhaust well 27' comprises a low pressure relief valve 61 within the body of the movable valve member 336 that controls communication between the outlet branch 20 of the through passage and the exhaust well 27'. Specifically, the valve member 336 is hollow, having a relief valve chamber 62 in its interior that is communicated through a coaxial bore 142 with the pressure chamber 35 behind the valve member and through non-restrictive radial holes 43' in its side wall with the exhaust well 27'. The wall of the relief valve chamber 62 around the bore 142 provides a seat for a ball 63 that is biased toward said seat by means of an expansion spring 64 which reacts against the opposite end of the relief valve chamber. The relief ball 63 tends to remain seated unless pressure of return fluid in the pressure chamber 35 exceeds a value determined by the strength of the spring 64, and when open the ball 50 restricts communication between the pressure chamber 35 and the exhaust well 27' as to assure that pressure in the exhaust passage 26 will always reflect the rate of flow of return fluid therein, and hence will correspond substantially to the rate of piston descent.

In the embodiment of the invention illustrated in FIGURE 6 there is a first restriction means 328 between exhaust passage 26 and the pressure chamber 35, and a second restriction means 428 between the pressure chamber and the outlet 15, so that fluid in the pressure chamber will have a pressure lower than that in exhaust passage 26 but higher than that in the exhaust well 27'. The first restriction means 328 comprises a relief valve element 163 located in a passage 242 that communicates the exhaust passage 26 with the pressure chamber 35 and biased toward a closed position by means of an expansion spring 164. The second restriction means 428 comprises radial holes 43 in the pressure responsive valve member 436, opening to a coaxial rearwardly opening well 142 therein, as in the first described embodiment of the invention.

With the arrangement of FIGURE 6, return fluid from the contracting side of the cylinder can be pressurized to a substantially high value in exhaust passage 26, to insure that a substantial portion of return fluid flow will be fed to the expanding side of the cylinder, while back pressure on the pump can be kept to a relatively low value under normal "float" conditions, owing to the relatively low pressure in the pressure chamber 35.

It will be appreciated that while the pressure responsive valve member that effects diversion of pump pressure fluid has been illustrated in each case as a poppet, it could as well comprise some other type of valve member, such as a spool having means associated with it to render it pressure responsive.

From the foregoing description taken with the accompanying drawings it will be apparent that this invention provides a control valve for a reversible hydraulic motor such as a double-acting hydraulic cylinder, which control valve has a "float" position wherein the service passages of the control valve and its inlets are all communicated with its outlet, and wherein return fluid from the contracting side of the motor is load pressurized and can flow to the expanding side of the motor together with pump fluid to the extent that such load pressurized return fluid is needed to prevent cavitation and maintain pressure in the system.

What is claimed as my invention is:

1. A control valve having a movable valve element to effect venting of a pressure fluid supply passage and each of first and second service passages in one operating position of the valve element at which it also effects communication between the supply passage and the first service passage, said control valve being characterized by:
   (A) means restricting the degree to which the second service passage is vented in said one operating position of the valve element;
   (B) and a pressure actuatable valve member to control venting of said supply passage and the first service passage in said one operating position of the valve element,
      (1) said valve member having means thereon to adapt it for movement toward open position in response to pressure of fluid obtaining in the supply passage to thereby enable supply passage fluid to bypass the first service passage in said one operating position of the valve element,
      (2) and said valve member having other means thereon to adapt it for movement toward closed position in response to pressure of return fluid in the second service passage at times when pressure therein exceeds the pressure of fluid in the first service passage.

2. The control valve of claim 1, further characterized by:
   (A) means defining a feedback passage through which return pressure fluid in the second service passage can flow to the first service passage;
   (B) and normally closed check valve means in said feedback passage arranged to open to permit flow of return fluid from the second service passage to the first service passage.

3. The control valve of claim 1, wherein said restricting means comprises a passageway which is independent of said pressure actuatable valve member.

4. The control valve of claim 2, wherein said restricting means comprises a passageway leading through said pressure actuatable valve member.

5. A control valve having a supply passage for fluid under pressure, an outlet passage leading to an outlet, first and second service passages for connection with opposite sides of a fluid motor, and a valve element movable to and from an operating position at which the supply passage and the first service passage, are communicated with one another and with the outlet passage, said control valve being characterized by:
   (A) a return fluid passage by which the second service passage is also communicable with the outlet in said operating position of the valve element;
   (B) restriction means for restricting fluid flow to the outlet from said return fluid passage, whereby pressure of fluid in the latter builds up rapidly whenever fluid from the second service passage flows thereinto at an abnormally high rate;
   (C) and fluid pressure responsive valve means governing flow of fluid to the outlet from the outlet passage,
      (1) said valve means being responsive to the pressure of fluid in the outlet passage and actuatable to an open position thereby in consequence of flow of pressure fluid to the outlet passage from the supply passage,
      (2) and said valve means being actuatable to closed position in response to the pressure of fluid in the return fluid passage whenever pressure therein rises to a predetermined value corresponding to flow of fluid from the second service passage to the return fluid passage at an abnormally high rate in said operating position of the valve element, to then compel pressure fluid to flow to the first service passage from the supply passage.

6. The control valve of claim 5, wherein said return fluid passage is communicated with the outlet through passage means in said pressure responsive valve means.

7. The control valve of claim 5, wherein said return fluid passage is communicated with the outlet through holes in said pressure responsive valve means and which holes provide said restriction means.

8. The control valve of claim 5, wherein said restriction means comprises a relief valve biased toward a closed position.

9. The control valve of claim 5, further characterized by:
   (A) said return fluid passage being communicated with the outlet through
      (1) a pressure relief valve located upstream from said valve means,
      (2) and a passageway downstream from said relief valve that restricts flow of fluid to the outlet from the downstream side of said relief valve;
   (B) and said valve means being movable toward closed position in response to pressure of fluid at the downstream side of said relief valve.

10. A control valve having a movable valve element which, in one position thereof, provides for flow of pressure fluid from a supply passage to an outlet via a through passage and which, in another position thereof, provides for venting of each of a pair of service passages and the supply passage to said outlet while communicating the supply passage with a first one of said service passages, said control valve being characterized by:
   (A) means providing a restriction to flow of return fluid from the second service passage to the outlet;
   (B) a pressure actuatable valve member governing the through passage, and past which all fluid entering the supply passage flows to the outlet in said one position of the valve element, said valve member having means thereon to adapt it for actuation to open position in response to pressure of fluid in the supply passage;
   (C) and means operable in said other position of the valve element for translating pressure of return fluid in the second service passage into motion of said valve member in the direction to close the through passage at times when pressure of return fluid in the second service passage exceeds the pressure of fluid in the supply passage.

References Cited

UNITED STATES PATENTS

| | | | |
|---|---|---|---|
| 2,980,135 | 4/1961 | Tennis | 137—596.12 |
| 2,980,136 | 4/1961 | Krehbiel | 91—436 |
| 3,134,402 | 5/1964 | Tennis | 137—596 |
| 3,194,265 | 7/1965 | Tennis | 137—596 |
| 3,263,574 | 8/1966 | Tennis | 91—436 |
| 3,267,961 | 8/1966 | Rice | 137—596 |

HENRY KLINKSIEK, Primary Examiner

U.S. Cl. X.R.

91—436; 137—596.12

PO-1050
(5/69)

UNITED STATES PATENT OFFICE
CERTIFICATE OF CORRECTION

Patent No. 3,465,728      Dated September 9, 1969

Inventor(s) F.H. Tennis

It is certified that error appears in the above-identified patent and that said Letters Patent are hereby corrected as shown below:

Column 2, line 35, "comprises" should read -- comprised Column 6, line 61, "unrestricted" should read --unrestricted Column 6, line 64 should read as follows: --tion means 23 causes pressure in the exhaust passage 26 and pressure in--. Column 6, line 66, "the seat" should read -- its seat--. Column 7, line 7, after "Figure 3" insert -- the --. Column 7, line 44, insert -- a -- before the word "plurality". Column 7, line 49, should read as follows: -- 50. A feeder passage 122 intersects the inlet chamber 119 --. Column 8, line 3, "chamber" is misspelled. Column 9, line 69, "inlets" should read -- inlet --.

SIGNED AND
SEALED

JUL 7 1970

(SEAL)
Attest:

Edward M. Fletcher, Jr.
Attesting Officer

WILLIAM E. SCHUYLER, JR.
Commissioner of Patents